United States Patent
Ji et al.

(10) Patent No.: US 11,678,643 B2
(45) Date of Patent: Jun. 20, 2023

(54) INTERACTIVE INTELLIGENT PET FEEDING DEVICE

(71) Applicant: Jiangsu Youmota Technology Co., Ltd., Nanjing (CN)

(72) Inventors: Jie Ji, Shandong (CN); Fengyuan Yang, Shandong (CN); Fan Liu, Shangdong (CN); Hao Li, Shangdong (CN); Chuandong Zhang, Shangdong (CN); Huali Ding, Shangdong (CN); Zhipeng Hu, Shandong (CN); Chen Chen, Shangdong (CN)

(73) Assignee: JIANGSU YOUMOTA TECHNOLOGY CO., LTD., Nanjing (CN)

( * ) Notice: Subject to any disclaimer, the term of this patent is extended or adjusted under 35 U.S.C. 154(b) by 749 days.

(21) Appl. No.: 16/626,577

(22) PCT Filed: Apr. 18, 2018

(86) PCT No.: PCT/CN2018/083475
§ 371 (c)(1),
(2) Date: Dec. 26, 2019

(87) PCT Pub. No.: WO2018/196663
PCT Pub. Date: Nov. 1, 2018

(65) Prior Publication Data
US 2020/0128786 A1   Apr. 30, 2020

(30) Foreign Application Priority Data

Apr. 28, 2017 (CN) .......................... 201720465630.5

(51) Int. Cl.
*A01K 5/02* (2006.01)
*G08B 7/06* (2006.01)
(Continued)

(52) U.S. Cl.
CPC .............. *A01K 5/0275* (2013.01); *G08B 7/06* (2013.01); *H04B 1/02* (2013.01); *A01K 15/025* (2013.01)

(58) Field of Classification Search
CPC .. A01K 15/025; A01K 5/0233; A01K 5/0275; A01K 5/0241
See application file for complete search history.

(56) References Cited

U.S. PATENT DOCUMENTS 3,955,537 A * 5/1976 Yujiri ................... A01K 5/0275
119/51.13
5,372,093 A * 12/1994 Pooshs ................ A01K 5/0291
119/51.11
(Continued)

*Primary Examiner* — Christopher D Hutchens
*Assistant Examiner* — Madison Elizabeth Dittner
(74) *Attorney, Agent, or Firm* — Andrew C. Cheng

(57) ABSTRACT

The present application discloses an interactive intelligent pet feeding device which belongs to the technical field of pet feeding devices, including a feeding device body, the feeding device body including a pet food feeding control device and a shake detection module, the pet food feeding control device being configured to realize quantitative feeding of pet food and prevent jamming of the pet food, the shake detection module being configured to detect the motion state of the feeding device body, the shake detection module being connected to a control module to implement data communication, and the control module implementing data communication with a mobile terminal through a wireless transmission module. The feeding device body further includes an upper casing, a lower casing provided below the upper casing, the upper casing and the lower casing being connected to form an inside hollow chamber, an upper part of the chamber being provided with a granary, a top lid being provided above the upper casing, and a feeding bowl being provided outside the lower casing. The device enable pets to obtain corresponding food according to the movement of (Continued)

pets, realize automatic pet feeding, and solve the problems in the prior art.

8 Claims, 6 Drawing Sheets

(51) Int. Cl.
  *H04B 1/02* (2006.01)
  *A01K 15/02* (2006.01)

(56) References Cited

U.S. PATENT DOCUMENTS

| | | | | |
|---|---|---|---|---|
| 6,273,027 | B1 * | 8/2001 | Watson | A01K 15/025 |
| | | | | 119/712 |
| 2016/0050888 | A1 * | 2/2016 | Berckmans | A01K 39/02 |
| | | | | 119/51.01 |
| 2016/0095296 | A1 * | 4/2016 | Ishikawa | A01K 5/0114 |
| | | | | 119/51.01 |
| 2016/0120146 | A1 * | 5/2016 | Parness | A01K 15/025 |
| | | | | 119/61.4 |
| 2018/0160648 | A1 * | 6/2018 | Goh | A01K 15/02 |

* cited by examiner

INTERACTIVE INTELLIGENT PET FEEDING DEVICE

TECHNICAL FIELD

The present invention relates to an interactive intelligent pet feeding device, which belongs to the technical field of pet feeding devices.

BACKGROUND

With the rapid development of modern economy, the urbanization process is accelerated, and the living standard is gradually increasing. Independence, closeness and the population aging have become increasingly prominent issues in modern city families. The residents urgently need ways of entertainment, leisure and emotional sustenance, and therefore more and more families choose feeding pets as their emotional sustenance to relieve the stress in their lives.

Many people are busy with work all day long. They cannot accompany pets around, cannot feed pets in a timely manner, and cannot properly arrange pets' diet. Sometimes they forget to feed pets in the morning, which leads to malnutrition in pets. Some owners put the food which is for the pet to eat for the whole day to their pets in the morning, some pets develop the habit of sleeping when they are full, and many pets thus become obese. Many pets can only wait at home lonely during the day. However, pets need entertainment just like people. Long-term loneliness will cause pets to become emotionally unstable and irritable, so that they start to destroy furniture and create unnecessary economic loss. It is also common for the owner to see a mess at home when he returns home, which seriously affects the mood of the owner. Therefore, many pets are punished or even abandoned by the owners.

There are many pet feeding products in the current pet products market. Some products can set the feeding time and the amount of food. A predetermined amount of food will be automatically released at the time set by the user, which solves the problem of feeding when the owner is away, but cannot solve problems of pet anxiety, obesity, and furniture destruction. Other products on the market are designed as rubber balls for nibbling. Users fill food in the balls. Pets need to get food from the feeder by shaking, biting, etc. However, these products have limited amount of food and the feeding time cannot be actively controlled. Once the food becomes loose, it will flow out of the feeder in large quantities. When the feeder is out of food, the feeder will not be able to attract pets enough, lazy pets will continue to sleep, and energetic pets will start to destroy furniture. Therefore, currently, there is an urgent need for a pet product that can ease loneliness for pets, urge pets to exercise for a long time, and effectively prevent pets from destroying furniture.

SUMMARY

The purpose of the present invention is to provide an interactive intelligent pet feeding device, which can enable pets to obtain corresponding food according to the movement of pets, realize automatic pet feeding, and solve the problems in the prior art.

The interactive intelligent pet feeding device according to the present invention comprises a feeding device body. The feeding device body includes a pet food feeding control device and a shake detection module. The pet food feeding control device is configured to realize quantitative feeding of pet food and prevent the pet food from being jammed. The shake detection module is configured to detect movement state of the feeding device body. The shake detection module is connected to a control module to implement data communication, and the control module implements data communication with a mobile terminal through a wireless transmission module.

The feeding device body is configured to feed. The pet food feeding control device is capable of realizing quantitative feeding of pet food and preventing pet food from being jammed. The shake detection module is configured to detect movement state of the feeding device body and transmit corresponding data to the control module. The control module transmits information to the mobile terminals via data transmission module to thereby achieve data synchronization between the mobile terminal and the feeding device.

The feeding device body further comprises an upper casing. A lower casing is provided at below the upper casing. The upper casing and the lower casing are connected to form an inside hollow chamber. An upper part of the chamber is provided with a granary, the pet food feeding control device is located below the granary, a top lid is provided above the upper casing, and a feeding bowl is provided outside the lower casing.

The granary is configured to store pet food for feeding. The feeding device body has an egg-like shape. The pet food is quantitatively released via the pet food feeding control device, and the released pet food reaches the feeding bowl to allow pets to eat. The top lid is configured for the pet food to be filled into the granary.

The pet food feeding control device includes a granary partition which divides the chamber into two parts. The granary partition is provided with a feeding funnel, and a lower end of the feeding funnel is connected to a food leakage channel. The food leakage channel communicates with the feeding bowl. The bottom of the feeding funnel is provided with a granary baffle. One side of the granary baffle is connected with a electromagnet which is electrically connected to the control module.

The granary is partitioned from outside by the granary partition. The feeding funnel provided on the granary partition facilitates accumulation of the pet food. The granary baffle arranged at the bottom of the feeding funnel cooperates with the electromagnet to control releasing of the pet food. At a non-feeding time, the granary baffle of the feeding device body is closed. During a feeding time period, the amount of exercise of the pet is detected by the shake detection device. If the pet's exercise energy exceeds the threshold set by the control module and the maximum number of food releases is not exceeded during this period of time, the electromagnet is energized to pull the granary baffle. The electromagnet is switched off shortly after it is energized. A little amount of pet food leaks from the leaking hole at the bottom of the feeding funnel. After the electromagnet is powered off, the granary baffle returns to its original position, the leaking hole is closed, and one feeding is completed.

Stirring teeth are provided at the upper side of the granary baffle. The stirring teeth pass through the bottom of the feeding funnel and are configured to move the pet food accumulated at the leaking hole of the feeding funnel.

Because long-term feeding is needed, the amount of the pet food for each time of feeding needs to be controlled within a few grains. Thus, the leaking hole should not be too large. As the feeder shakes, the pet food will often be jammed at the leaking hole. In order to solve this problem, two stirring teeth are provided on the granary baffle. The granary baffle can be quickly opened and closed by an electromagnet. During the process of opening and closing of the granary baffle, the stirring teeth will move the pet food at the leaking hole to form a cavity below the pet food to thereby loosen the pet food and prevent the pet food from being jammed at the leaking hole.

The shake detection module includes a gyroscope, the control module includes a control chip, and the gyroscope is electrically connected to the control chip. The gyroscope and the control chip both are located inside the lower casing, and the control chip is also connected to a sound and light alarm module.

The gyroscope detects its own movement state in real time and transmits the corresponding data to the control module in real time. The control module obtains the tilt angle of the feeding device body relative to a horizontal direction and records the tilt angle. When a large angle appears, it is determined that the pet is moving.

A balancing weight placement area is provided inside the lower casing, so that the shape of the feeding device body is similar to the design of the tumbler. Balancing weights are added inside the product, so that the center of gravity of the product is very low, and the product can stay upright when there is no action of an external force in the horizontal direction.

A battery pack is further provided inside the lower casing, and the battery pack is located below the control chip. The battery pack is electrically connected to the control chip, the gyroscope and the electromagnet. The battery pack is further connected to a power switch and a charging interface. Power is supplied to the control chip, the gyroscope and the electromagnet via the battery pack. The power switch and the charging interface are exposed to an outside at the bottom of the lower casing to allow switching on/off of the power switch and charging of the battery pack.

A water guiding channel is arranged at the outside of the granary baffle. The water guiding channel defines an opening in the direction of the food leakage channel. A water guiding eaves is formed at the junction between the water guiding channel and the food leakage channel. If a small amount of water flows from the food feeding funnel when the user cleans the feeding device body, the water will flow through the water guiding channel to the food leakage channel, and the water guiding caves can guide the water into the food leakage channel more quickly, and can also prevent the water from flowing from the junction into the inside of the feeding device body when it is tilted, thereby preventing water from entering into and damaging the feeding device body.

The wireless transmission module comprises one or more of a WIFI module, 3G module, 4G module, Bluetooth module and 2.4G module. The wireless transmission module comprises a known wireless transmission module in the prior art.

The mobile terminal comprises a mobile phone or a Tablet PC. The mobile terminal is a smart electronic device carried by users daily.

Comparing with the prior arts, the present embodiment has the following advantages:

An interactive intelligent pet feeding device is provided, which enable pets get corresponding food according to movement of the pets, detect the pet's motion, quantitatively distribute food in small batches based on the amount of exercise of the pet, and set parameters such as time, amount of food, number of exercise, intensity of exercise. The interactive intelligent pet feeding device is suitable for pets of different species and breeds and can prevent pet food from being jammed. Tumbler structure design can make the device return to its original position. Feeding bowls can be used in any combination. The waterproof device is waterproofed during daily use, so that it is washable. The interactive intelligent pet feeding device has a function of reminding pets to exercise and eat and provides multiple reminders (sound and light, etc.). The interactive intelligent pet feeding device is capable of doing statistics of pet exercise and feeding amount, data analysis and giving advice to achieve automatic feeding of pets. Pets need to shake the feeding device to obtain food, which not only guarantees the pet's exercise amount, but also maintains a long-term attraction of the pet to the feeding device, which prevents the pet from damaging the furniture and stimulates the pet's predatory nature. The problems in the prior art are solved. The interactive intelligent pet feeding device can be used widely.

BRIEF DESCRIPTION OF THE ACCOMPANYING DRAWINGS

Figure 1:
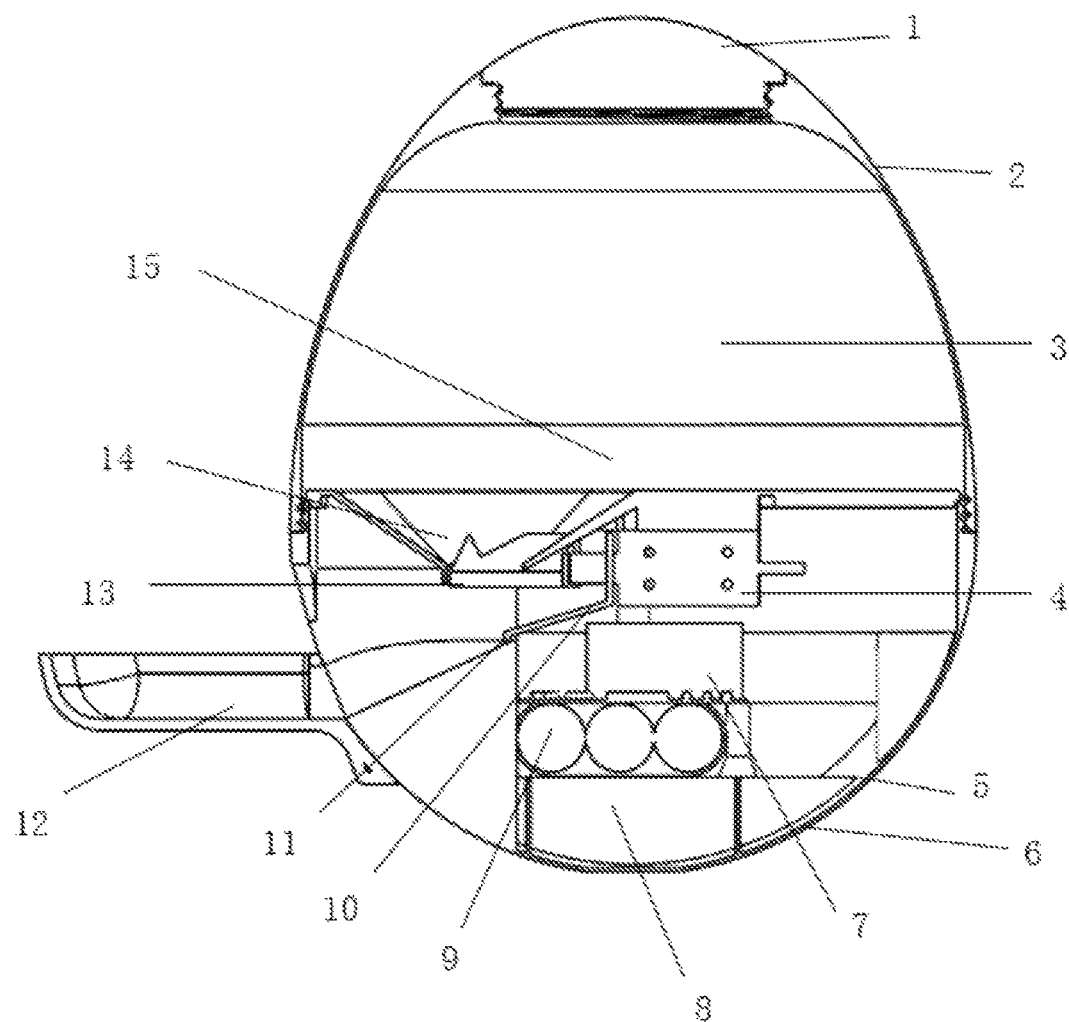
FIG. 1 is a schematic diagram of the overall structure of an embodiment of the present invention.

In the drawings: 1. top lid; 2. upper casing; 3. granary; 4. electromagnet; 5. charging interface; 6. lower casing; 7. control chip; 8. balancing weight; 9. battery pack; 10. water guiding channel; 11. food leaking channel; 12. bowl; 13. granary baffle; 14. feeding funnel; 15. granary partition; 16. power switch; 17. stirring teeth; 18. water guiding eaves

DETAILED DESCRIPTION

The following further describes the present application with reference to the drawings and embodiments:

Embodiment

Figure 2:
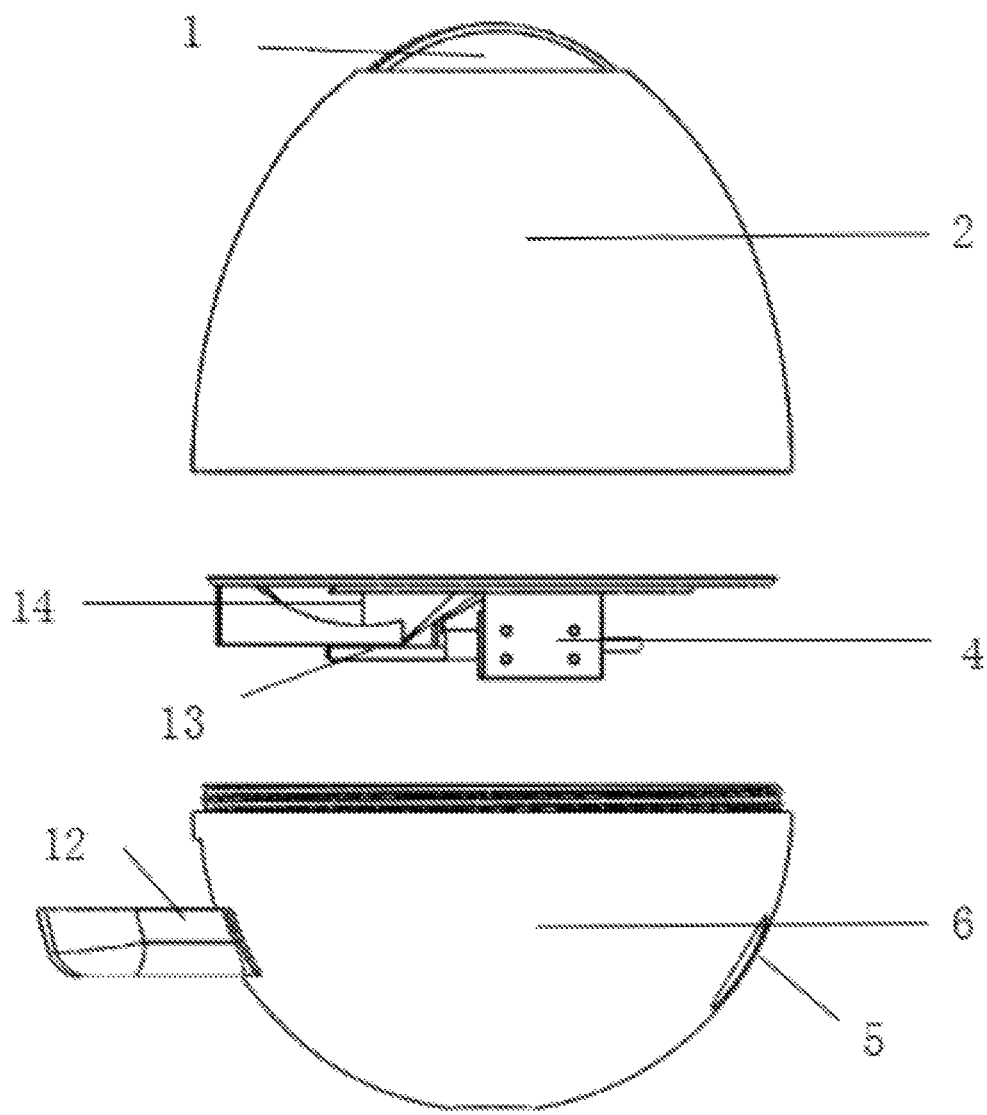
FIG. 2 is an exploded view of the overall structure of the embodiment of the present invention.
Figure 3:
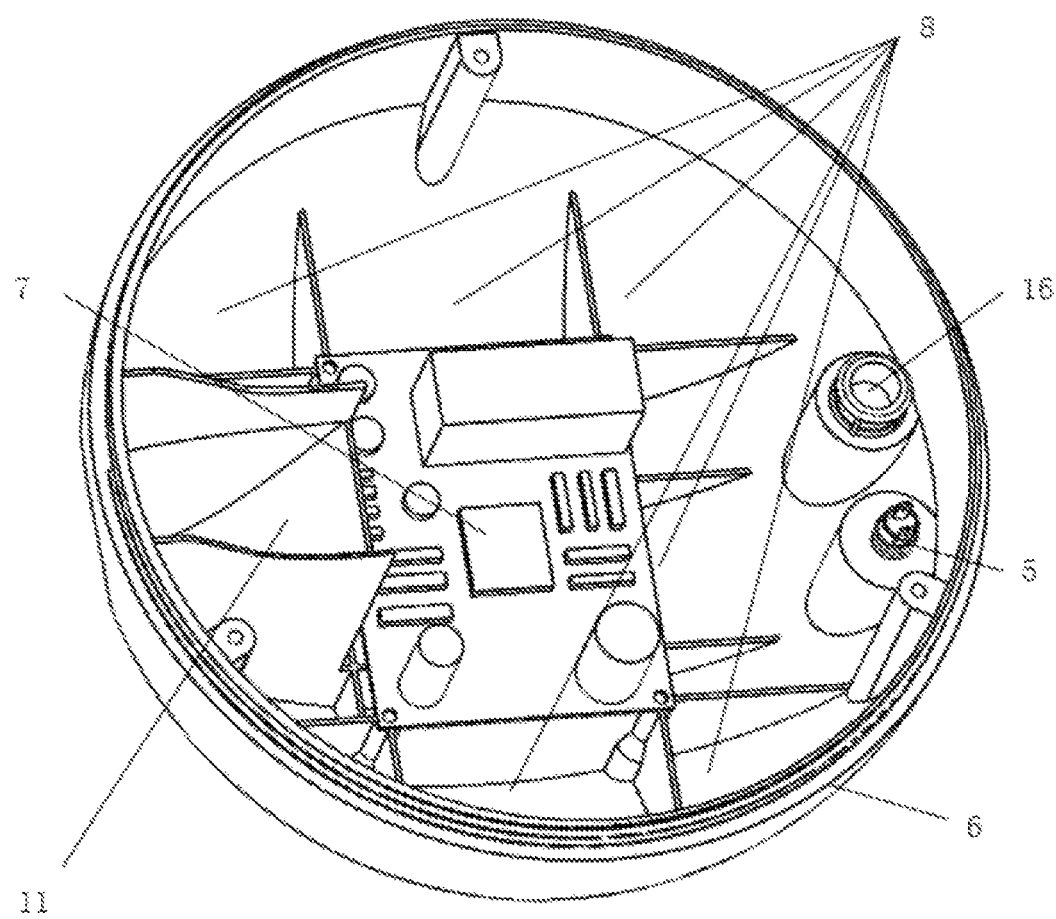
FIG. 3 is a schematic diagram of the internal structure of the bottom shell in the embodiment of the present invention.
Figure 4:
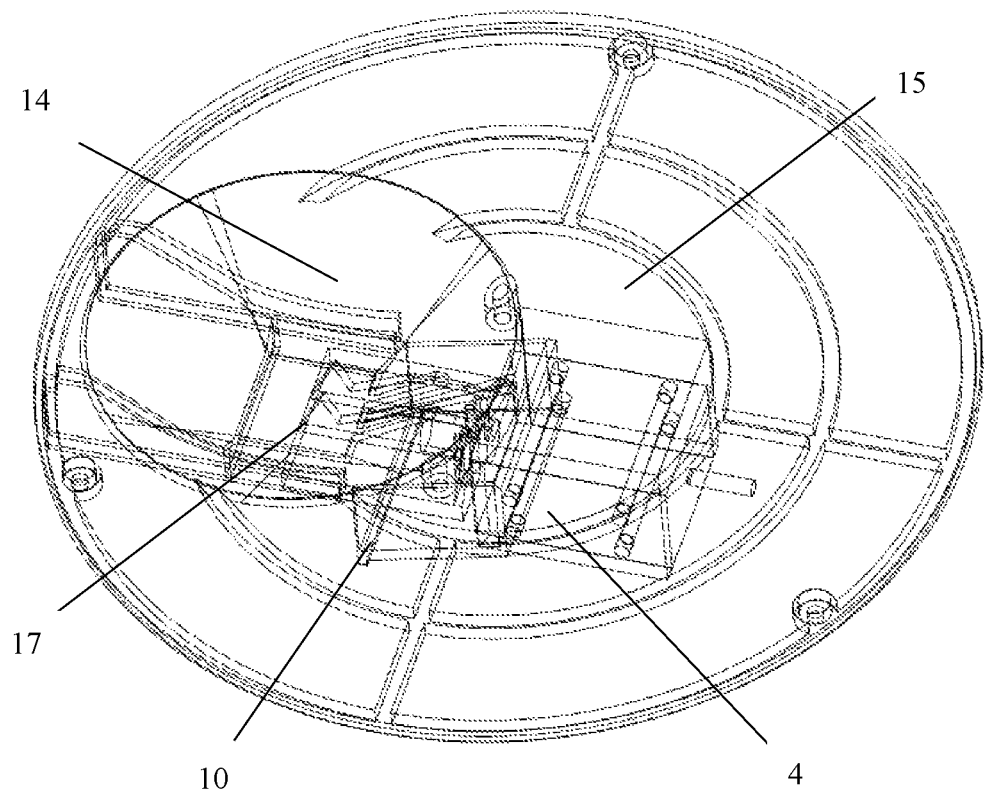
FIG. 4 is an enlarged view of a food leakage partition in the embodiment of the present invention.
Figure 5:
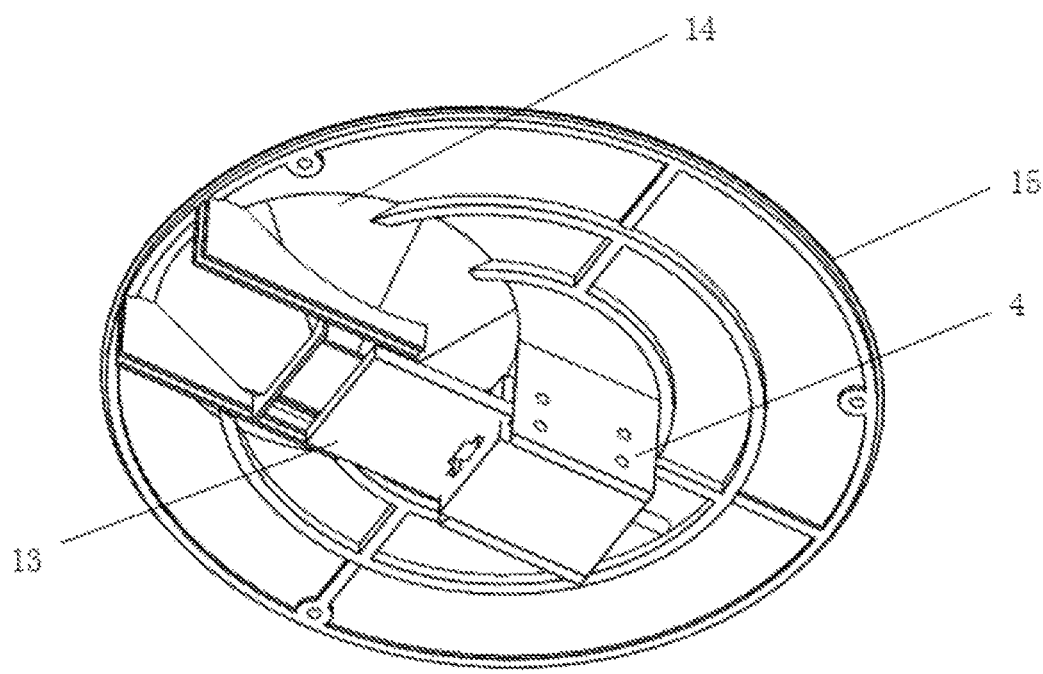
FIG. 5 is a schematic diagram of the structure under the food leakage partition in the embodiment of the present invention.
Figure 6:
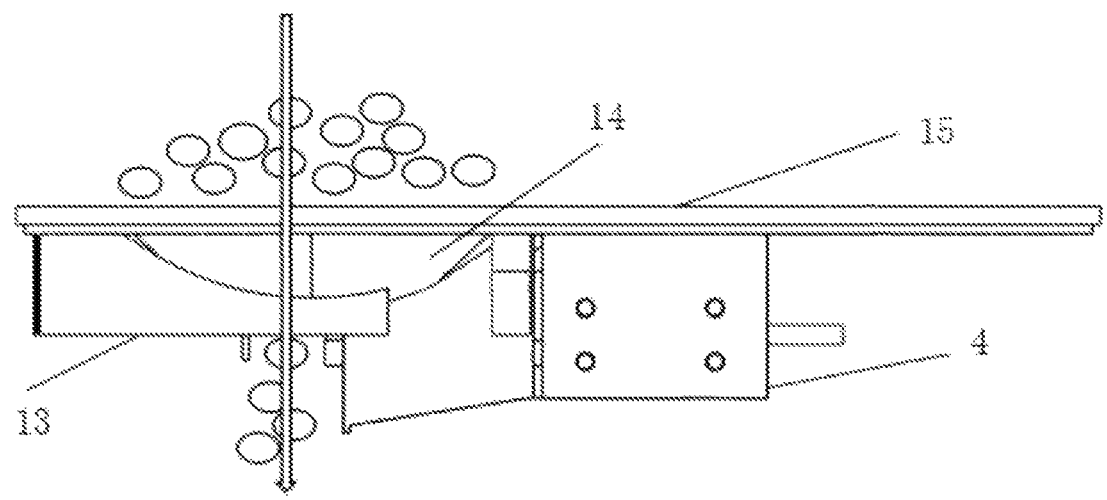
FIG. 6 is a schematic diagram of the effect of a food leaking partition in an embodiment of the present invention.
Figure 7:
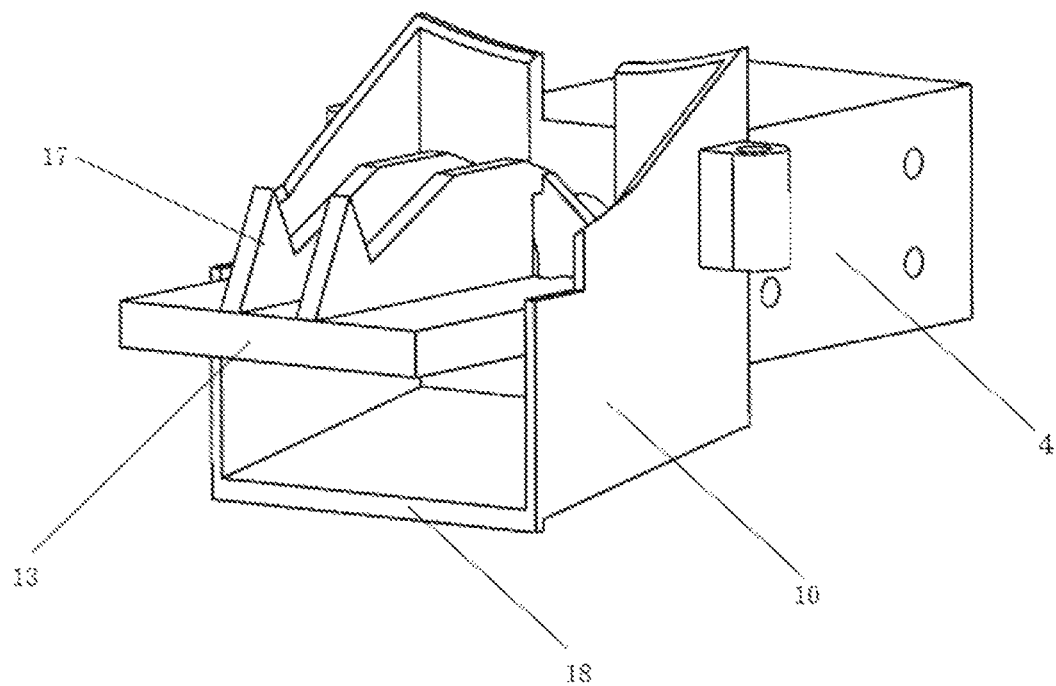
FIG. 7 is an enlarged schematic view of a structure of a water guiding tank in an embodiment of the present invention.
Figure 8:
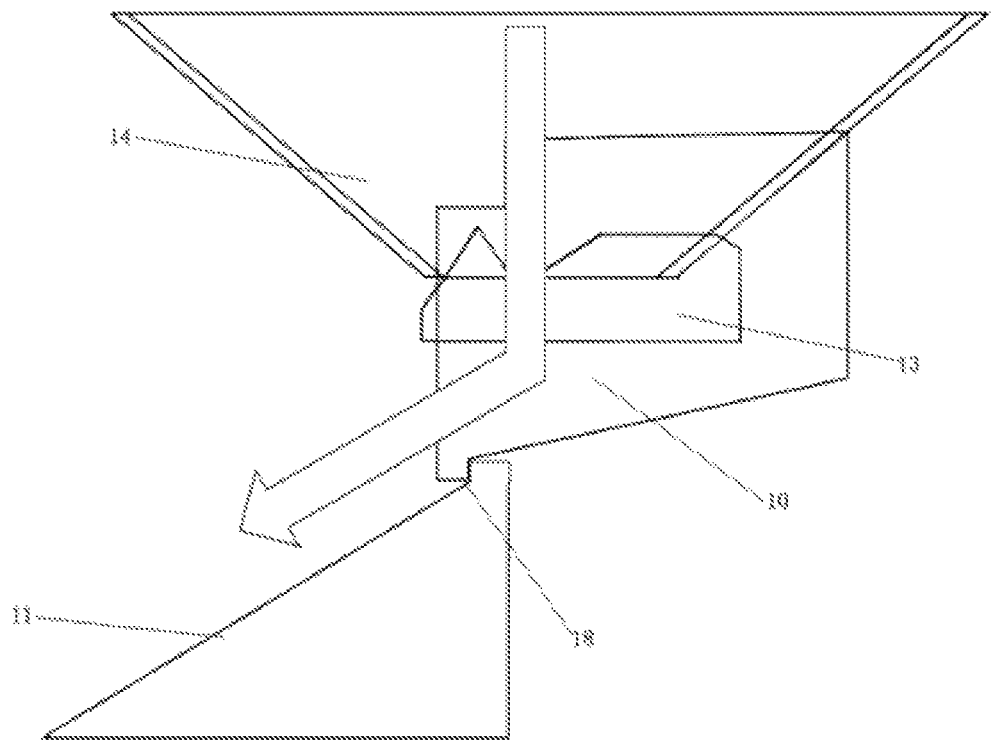
FIG. 8 is a schematic view of water flowing out of a feeder through a leak-proof tank and a food leakage channel in an embodiment of the present invention.
Figure 9:
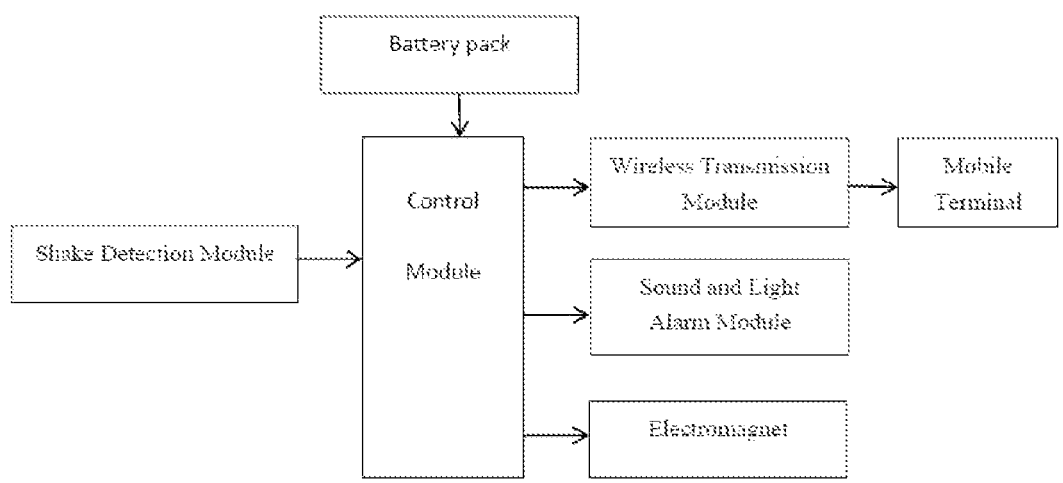
FIG. 9 is a circuit block diagram of a control chip in an embodiment of the present invention.

As shown in FIGS. 1-9, the interactive intelligent pet feeding device according to the present invention includes a feeding device body. The feeding device body includes a pet food feeding control device and a shake detection module, and the pet food feeding control device is configured to realize quantitative feeding of pet food and prevent pet food from being jammed. The shake detection module is configured to detect the movement status of the feeding device body. The shake detection module is connected to a control module to implement data communication, and the control module implements data communication with mobile terminals through a wireless transmission module.

In order to further illustrate the above embodiment, the feeding device body further includes an upper casing 2, a lower casing 6 is disposed below the upper casing 2, and the upper casing 2 and the lower casing 6 are connected to form an inside hollow chamber. A granary 3 is disposed at an upper part of the cavity. The pet food feeding control device is located below the granary 3. A top lid 1 is provided above the upper casing 2, and a feeding bowl 12 is provided outside the lower casing 6.

In order to further illustrate the above embodiment, the pet food feeding control device includes a granary partition 15 which divides the chamber into two parts. The granary partition 15 is provided with a feeding funnel 14, and a lower end of the feeding funnel 14 is connected to a food leakage channel 11. The food leakage channel 11 communicates with the feeding bowl 12. The bottom of the feeding funnel 14 is provided with a granary baffle 13. One side of the granary baffle 13 is connected with an electromagnet 4, and the electromagnet 4 is electrically connected to the control module.

In order to further explain the above embodiment, stirring teeth 17 are provided at the upper side of the granary baffle 13. The stirring teeth 17 pass through the bottom of the feeding funnel 14 and are configured to stir the pet food at a leaking hole of the feeding funnel 14.

In order to further explain the above embodiment, the shake detection module includes a 6-axis gyroscope, the control module includes a control chip, and the 6-axis gyroscope is electrically connected to the control chip. The 6-axis gyroscope and the control chip both are located inside the lower casing 6, and the control chip is also connected to a sound and light alarm module.

In order to further illustrate the above embodiment, a balancing weight placement area 8 is further provided inside the lower casing 6.

In order to further explain the above embodiment, a battery pack 9 is further provided inside the lower casing 6, and the battery pack 9 is located below the control chip 7. The battery pack 9 is electrically connected to the control chip 7, the 6-axis gyroscope and the electromagnet 4. The battery pack 9 is further connected to a power switch 16 and a charging interface 5.

In order to further explain the above embodiment, a water guiding channel 10 is arranged at the outside of the granary baffle 13. The water guiding channel 10 is provided with an opening in the direction of the food leakage channel 11. A water guiding eaves 18 is formed at the junction between the water guiding channel 10 and the food leakage channel 11.

In order to further explain the above embodiment, the wireless transmission module is one or more of a WIFI module, 3G module, 4G module, Bluetooth module and 2.4G module.

In order to further explain the above embodiment, the mobile terminal comprises a mobile phone or a Tablet PC.

The working principle of the embodiment is as below: when feeding, the pet food is put into the granary 3 through opening the top lid 1. When a pet comes to eat pet food, the gyroscope detects its own movement state in real time and transmits the corresponding data to the control chip 7 in real time. The control chip 7 obtains the tilt angle of the feeding device body relative to a horizontal direction and records the tilt angle. When a large angle appears, it is determined that the pet is moving. If the pet's exercise energy exceeds the threshold set by the control chip 7 and the maximum number of food releases is not exceeded in this period of time, the electromagnet 4 is energized and the granary baffle 13 is pulled, so that the pet food leaks from the leaking hole at the bottom of the feeding funnel 14 and reaches the feeding bowl 12 through the leaking channel 11 for the pet to eat. After a short time, the electromagnet 4 is powered off, the granary baffle 13 returns to its original position, and the leaking hole is closed, thus completing one feeding. The control chip 7 transmits information to the mobile terminal through the data transmission module to achieve data synchronization between the mobile terminal and the feeding device body.

The interactive intelligent pet feeding device according to the embodiment of the present invention described above with reference to the accompanying drawings can enable pets to obtain corresponding food according to the pet's movement, realize automatic feeding of pets, and solve the problems in the prior art. It will be apparent to those skilled in the art that various modifications and variations can be made to the disclosed structure without departing from the scope or spirit of the invention. In view of the foregoing, it is intended that the present invention cover modifications and variations of this invention provided they fall within the scope of the following claims and their equivalents.

The invention claimed is:

1. An interactive intelligent pet feeding device comprising a feeding device body, wherein the feeding device body comprises:
   a pet food feeding control device, the pet food feeding control device being configured to realize quantitative feeding of pet food and prevent jamming of the pet food; and
   a shake detection module, the shake detection module being configured to detect the motion state of the feeding device body, the shake detection module being connected to a control module to implement data communication, and the control module implementing data communication with a mobile terminal through a wireless transmission module,
   wherein the feeding device body further comprises an upper casing (2), a lower casing (6) provided below the upper casing (2), the upper casing (2) and the lower casing (6) being connected to form an inside hollow chamber; and
   wherein the shake detection module includes a gyroscope; the control module includes a control chip (7); the gyroscope is electrically connected to the control chip (7); the gyroscope and the control chip (7) both are located inside the lower casing (6); and the control chip (7) is further connected to a sound and light alarm module;
   wherein an upper part of the chamber is provided with a granary (3), the pet food feeding control device being located below the granary (3), a top lid (1) being provided above the upper casing (2), and a feeding bowl (12) being provided outside the lower casing (6); and
   wherein the pet food feeding control device includes a granary partition (15) which divides the chamber into two parts, the granary partition (15) is provided with a feeding funnel (14), a lower end of the feeding funnel (14) is connected to a food leakage channel (11), the food leakage channel (11) communicates with the feeding bowl (12), a bottom of the feeding funnel (14) is provided with a granary baffle (13), one side of the granary baffle (13) is connected with an electromagnet (4), and the electromagnet (4) is electrically connected to the control module.

2. The interactive intelligent pet feeding device of claim 1, wherein stirring teeth (17) are provided at an upper side of the granary baffle (13), the stirring teeth (17) passing through the bottom of the feeding funnel (14) and being configured to stir the pet food at a leaking hole of the feeding funnel (14).

3. The interactive intelligent pet feeding device of claim 1, wherein the lower casing (6) is further provided with a balancing weight placement area (8).

4. The interactive intelligent pet feeding device of claim 1, wherein a battery pack (9) is provided inside the lower casing (6), the battery pack (9) is located below the control chip (7), the battery pack (9) is electrically connected to the control chip, the gyroscope and the electromagnet (4), and the battery pack (9) is further connected to a power switch (16) and a charging interface (5).

5. The interactive intelligent pet feeding device of claim 1, wherein a water guiding channel (10) is arranged at an outside of the granary baffle (13), the water guiding channel (10) defines an opening in a direction of the food leakage channel (11), a water guiding eaves (18) is formed at a junction between the water guiding channel (10) and the food leakage channel (11).

6. The interactive intelligent pet feeding device of claim 1, wherein the wireless transmission module comprises one or more of a WIFI module, a 3G module, a 4G module, a Bluetooth module and a 2.4G module.

7. The interactive intelligent pet feeding device of claim 1, wherein the mobile terminal comprises a mobile phone or a Tablet PC.

8. An interactive intelligent pet feeding device comprising a feeding device body, Wherein the feeding device body comprises:

a pet food feeding control device, the pet food feeding control device being configured to realize quantitative feeding of pet food and prevent jamming of the pet food; and a shake detection module, the shake detection module being configured to detect the motion state of the feeding device body, the shake detection module being connected to a control module to implement data communication, and the control module implementing data communication with a mobile terminal through a wireless transmission module;

wherein the feeding device body further comprises an upper casing (2), a lower casing (6) provided below the upper casing (2), the upper casing (2) and the lower casing (6) being connected to form an inside hollow chamber;

wherein the pet food feeding control device includes a granary partition (15) which divides the chamber into two parts, the granary partition (15) is provided with a feeding funnel (14), a lower end of the feeding funnel 14 is connected to a food leakage channel (11), the food leakage channel (11) communicates with the feeding bowl (12), a bottom of the feeding funnel (14) is provided with a granary baffle (13), one side of the granary baffle (13) is connected with an electromagnet (4), and the electromagnet (4) is electrically connected to the control module; and wherein stirring teeth (17) are provided at an upper side of the granary baffle (13), the stirring teeth (17) passing through the bottom of the feeding funnel (14) and being configured to stir the pet food at a leaking hole of the feeding funnel (14).

\* \* \* \* \*